A. B. SPANGLER.
FOUNTAIN PEN.
APPLICATION FILED JULY 27, 1908.
937,110.
Patented Oct. 19, 1909.
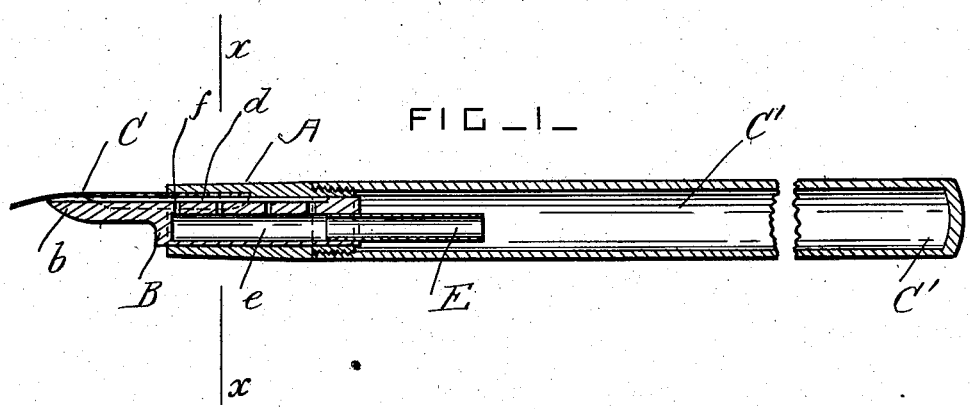
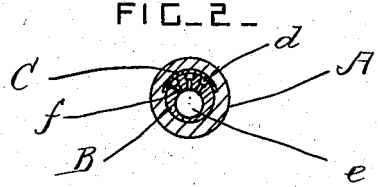
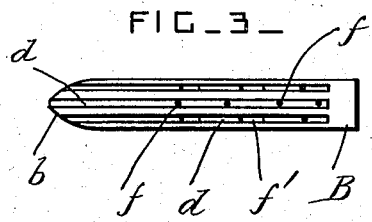
WITNESSES:
INVENTOR
Arthur B. Spangler.
BY
Herbert W. Jenner.
Attorney

UNITED STATES PATENT OFFICE.

ARTHUR BRAND SPANGLER, OF NEW ORLEANS, LOUISIANA.

FOUNTAIN-PEN.

937,110.

Specification of Letters Patent.

Patented Oct. 19, 1909.

Application filed July 27, 1908. Serial No. 445,638.

*To all whom it may concern:*

Be it known that I, ARTHUR BRAND SPANGLER, a citizen of the United States, residing at New Orleans, in the parish of Orleans and State of Louisiana, have invented certain new and useful Improvements in Fountain-Pens; and I do hereby declare the following to be a full, clear, and exact description of the invention, such as will enable others skilled in the art to which it appertains to make and use the same.

This invention relates to fountain-pens; and it consists in the novel construction and combination of the parts hereinafter fully described and claimed whereby the writing-fluid is formed from water and coloring-matter at the pen as required.

In the drawings, Figure 1 is a longitudinal section through a pen, drawn to an enlarged scale. Fig. 2 is a cross-section taken on the line $x$—$x$ in Fig. 1. Fig. 3 is a plan view of the feeder, showing a modification.

A is a short tubular holder, and B is a feeder formed of a plug which is inserted in the holder A.

C is the pen which is of any approved form, and which is held between the feeder and the holder.

The front end of the feeder is provided with a feeding-beak $b$ which bears against the nibs of the pen near their points.

C' is a tubular reservoir for water which is secured to the holder A.

The feeder is provided with longitudinal grooves $d$ in its outer surface which extend from the point of the feeding-beak $b$ to within a short distance of its rear end, but which do not extend to its rear end. A chamber $e$ for coloring-matter, such as ink-powder, is formed within the feeder and is open to the reservoir at its rear end. Cross-holes $f$ are formed in the feeder which connect the chamber $e$ with the grooves $d$. The front end of the chamber $e$ is closed, and it is arranged under the grooves $d$ and eccentric of the cylindrical feeder-plug. The small openings $f$ or $f'$ are arranged at short distances apart longitudinally, and these openings and the grooves are formed in the thicker side of the plug. In this manner a chamber $e$ of ample size and area for holding solid soluble coloring matter is provided, and the holder does not become so large externally as to be inconvenient to hold between the fingers in writing. A multiplicity of very small holes is provided so that a strainer is formed which prevents the escape of solid matter from the chamber $e$ in the form of mud, but which permits the dissolved coloring matter to pass to the pen point.

In the modification shown in Fig. 3, slits $f'$ are shown, and both holes $f$ and slits $f'$ can be used if desired, for the same purpose.

E is a removable supply chamber or tube for coloring-matter which is inserted in the rear end of the holder and which projects within the reservoir, but this removable supply chamber can be dispensed with if desired. The water from the reservoir dissolves portions of the coloring-matter in its passage through the chamber $e$, so that a suitable writing-fluid is formed. This writing-fluid passes through the longitudinal grooves to the pen points as required in the act of writing, and air finds its way up the said grooves to take the place of the water in the reservoir.

The reservoir can be refilled with water as often as required, and the pen will last for a long time without an additional supply of coloring-matter. The water in the reservoir can be thrown away if the pen is not required for some time.

The supply of coloring-matter can be renewed as often as necessary, and the auxiliary chamber E is a great convenience in refilling, and it enables a large supply of coloring matter to be carried. The coloring matter is preferably inserted in the form of crayons or plugs, which dissolve readily in water.

What I claim is:

1. In a fountain-pen, the combination, with a holder, of a feeder-plug inserted in the holder and provided with an external groove for ink, said plug having a chamber for solid soluble coloring matter under the said groove, and having also a multiplicity of small openings which connect the said chamber with the said groove, said openings being arranged at short distances apart and forming a strainer which prevents the escape of solid matter from the said chamber, and a reservoir connected to the said chamber and supplying water to dissolve the said coloring matter.

2. In a fountain-pen, the combination, with a holder, of a feeder-plug inserted in the holder and provided with a longitudinal groove for ink closed at its rear end, said plug having a chamber for coloring matter under the said groove and closed at its front end, and having also a series of small openings spaced at short distances apart longitudinally and connecting the said groove and chamber, a reservoir for water connected to the open end of the chamber, and a removable tube for additional coloring matter engaging with the said chamber and projecting into the said reservoir.

In testimony whereof I have affixed my signature in the presence of two witnesses.

ARTHUR BRAND SPANGLER.

Witnesses:
 JOHN HENRY GEORGE,
 GEO. W. MOORE.